H. C. KESSLER.
ROAD MAP.
APPLICATION FILED APR. 27, 1921.

1,424,919.                                   Patented Aug. 8, 1922.

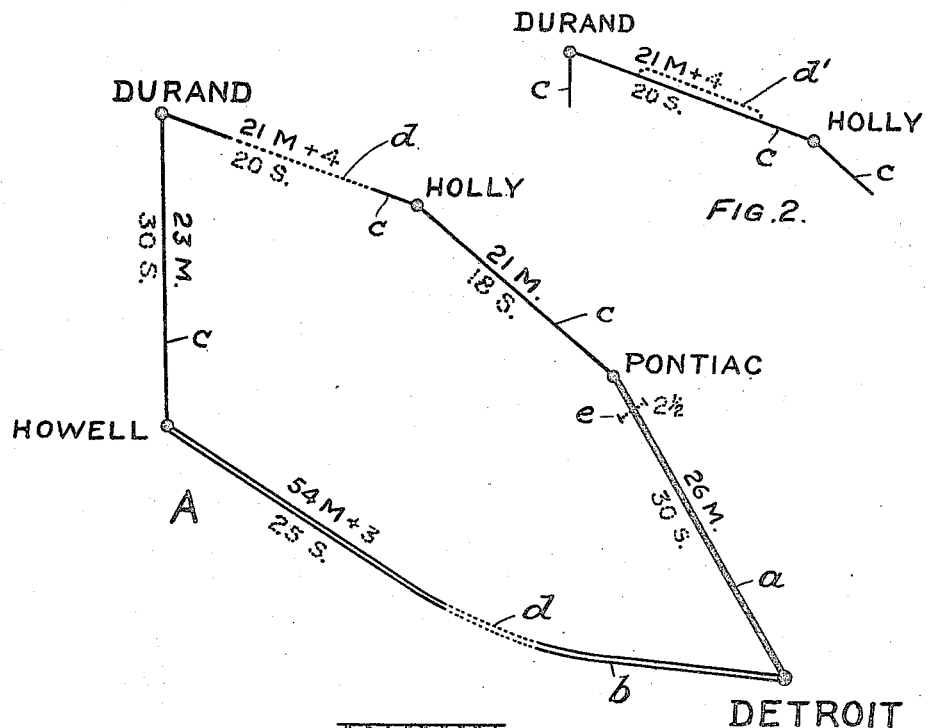

INDEX

- $a$- ══ PAVED ROAD
- $b$- ═ MACADAM
- $c$- ── DIRT ROAD
- $d$- ········ DETOUR
- $e$- ├──┤ WEAK BRIDGE - WEIGHT LIMIT SHOWN IN TONS.

RED FIGURES MARKED (S) INDICATE AVERAGE SPEED WHICH CAN BE MAINTAINED

RED FIGURES ON DETOURS INDICATE THE INCREASED NUMBER OF MILES DUE TO THE DETOUR. THESE ADDED TO THE BLACK FIGURES GIVE THE CORRECT DISTANCE.

FIG. 1.

INVENTOR
Harry C. Kessler
BY
Frank S. Busser
ATTORNEY.

WITNESS:
Robt R Kitchel

UNITED STATES PATENT OFFICE.

HARRY C. KESSLER, OF WARRINGTON, PENNSYLVANIA, ASSIGNOR TO BREUKER & KESSLER COMPANY, OF PHILADELPHIA, PENNSYLVANIA, A CORPORATION OF PENNSYLVANIA.

ROAD MAP.

1,424,919.　　　　　Specification of Letters Patent.　　Patented Aug. 8, 1922.

Application filed April 27, 1921. Serial No. 464,901.

*To all whom it may concern:*

Be it known that I, HARRY C. KESSLER, a citizen of the United States, residing at Warrington, county of Bucks, and State of Pennsylvania, have invented a new and useful Improvement in Road Maps, of which the following is a full, clear, and exact description, reference being had to the accompanying drawings, which form a part of this specification.

My invention relates to an improvement in road maps and has for its object, broadly, the provision of a road map of such a character as to combine simplicity with a maximum of information as to road conditions, distances, detours, etc., and at the same time to so set forth the desired information as to render it complete at a glance.

Heretofore it has been customary to publish road maps, covering various sections of greater or less extent, for the guidance of motorists on tour, or suggestive of short trips. Such maps are so prepared as to indicate by different types of lines, as heavy and light, dotted, etc., various types of road as paved, macadam, dirt, etc. existing between the towns and cities indicated on the map. The distances between the various places of importance shown are also customarily indicated.

Such maps, although of undoubted value, are more often than not misleading since road types are constantly being changed by new construction or repairs, necessitating the diversion of traffic over by roads constituting what is commonly termed a detour, and since, as is well known, the condition of any given stretch of road is constantly changed by the wear of traffic and damage from storms. Further, such maps fail to give the most essential information demanded by the motorist, which is, in effect, the time required to travel from one place to another, and which from the present types of map the motorist must deduce for himself on the basis of scanty and probably fallacious information.

The object of my invention more specifically is to provide a road map so prepared as to indicate the route from one place to another to indicate the various types of road existing over the route with special indication of detours, to indicate the normal distance between the two places and separately the excess distance necessitated by existing detours, and finally to indicate as a result of actual test the average speed in miles per hour maintainable over the route.

The road map in accordance with my invention is issued periodically as the result of actual observation and test of the road conditions with such frequency as may be necessitated by the beginning and completion of construction and repair work and by the volume of traffic and weather conditions.

Having now broadly indicated the nature of my invention, I will proceed to describe an embodiment thereof, in detail, with reference to the accompanying drawings, in which—

Fig. 1 illustrates a map showing a choice of routes from Detroit to Durand, Michigan, one via Pontiac and the other via Howell, with an accompanying "index" of matter explanatory of the symbols used.

Fig. 2 illustrates a modification.

Referring to Figure 1, beneath the road map A is placed the index B. The road from Detroit to Pontiac having been found to be "paved road" is indicated by a heavy black road line *a*, a weak bridge is indicated by the symbol shown at *e*, the weight limit of the bridge being indicated in tons adjacent the symbol by the symbols "2½" printed in red. The distance, by the road indicated, between Detroit and Pontiac is indicated by symbols "26 M." printed in black and paralleling the road line. On the opposite side of the road line the average speed in miles per hour maintainable over the road, determined by actual test, is indicated by the symbols "30 S." printed in red.

The road from Pontiac to Holly, having been found to be dirt road, is indicated by the thin black line *c*, the distance being indicated by the symbols "21 M." in black and the average speed in miles per hour maintainable being indicated by the symbols "18 S." in red.

The road from Holly to Durand is found to be dirt road, a part of which is under construction or repair, necessitating a detour, the open portion is indicated by the thin black line *c* and the portion detoured is indicated by a thin red line *d*. The normal distance from Holly to Durand is indicated by the symbols "21 M." in black and the additional distance necessitated by the detour is indicated adjacent the indication of the normal distance by the symbols "+ 4" printed in red. The average speed in miles per hour maintainable between Holly and Durand including the detour is then indicated by the symbols "20 S." in red. In connection with the alternate route to Durand by way of Howell, the road types, detours, distances, excess distances due to detours, and average speeds maintainable from place to place are indicated in a manner similar to that in connection with the route from Detroit to Durand by way of Pontiac above described, the macadam road from Detroit to Howell being indicated by the double lines $b$.

Referring now to Figure 2, in which I have illustrated a modification, the road from Holly to Durand involves a detour. The detoured portion, instead of being indicated by a red line section, as in Figure 1, is indicated by a separate red line $d'$ connected at its ends to the main road at the extremes of the portion detoured.

It will now be obvious that one desiring to travel from Detroit to Durand need only consult the above described map. A choice of routes present themselves, that via Pontiac and that via Howell. A glance at the map discloses that via Pontiac, the road to Pontiac is paved and the surface is in such a condition as to enable an average speed of thirty miles per hour to be maintained. From Pontiac to Holly there is a dirt road and its condition is disclosed by the fact that an average speed of only eighteen miles per hour may be maintained. A dirt road runs from Holly to Durand and a detour is met with, which increases the distance to be traveled by four miles, making the total distance to be twenty-five instead of the normal twenty-one miles. The condition of this stretch of road and detour is indicated by the fact that twenty miles per hour may be averaged.

Digesting the information presented as to the route via Pontiac, it will be seen that the road conditions are such that the distance is seventy-two miles instead of the normal sixty-eight and that the road surfaces are in such condition that the trip will require three hours and five minutes.

A study of the route via Howell discloses macadam road from Detroit to Howell, with a detour which increases the normal distance by three miles and conditions permitting an average speed of twenty-five miles per hour. From Howell to Durand, a dirt road is encountered of such a nature as to permit an average speed of thirty miles an hour. Digesting this information, it is found that the normal distance of seventy-seven miles is increased to eighty miles by the three mile detour and that road conditions are such as to enable the trip to be made in two hours and fifty-five minutes.

It will be obvious that maps prepared in accordance with my invention will be of great value in that they disclose road conditions with great accuracy in average speed maintainable, normal distances, and location, and excess distances necessitated by detours, information not obtainable from the mere indication of road types as is customary in road maps as heretofore prepared.

Having now fully described my invention, what I claim and desire to protect by Letters Patent is:

1. An automobile road map having marks indicative of localities, lines indicative of roads connecting localities, figures adjacent said lines indicative of mileage between localities on roads indicated by such lines, and other figures adjacent said lines indicative of practicable speeds obtainable on such roads between such localities.

2. An automobile road map having marks indicative of localities, lines indicative of roads connecting localities, figures adjacent said lines indicative of mileage between localities on roads indicated by such lines, and other figures associated with the first figures indicative of additional mileage on such roads by way of temporary detours necessitated by the condition of the roads.

3. An automobile road map having marks indicative of localities, lines indicative of roads connecting localities, figures adjacent said lines indicative of mileage between localities on roads indicated by such lines, certain of said lines having a differential characteristic indicating detours, and additional figures indicative of extra mileage between localities by way of said detours.

4. An automobile road map having marks indicative of localities, lines indicative of roads connecting localities, figures adjacent said lines indicative of mileage between localities on roads indicated by such lines, certain of said lines having a differential characteristic indicating detours, said differential lines being so positioned between localities as to graphically indicate the distance of the extremities thereof from adjacent localities.

5. An automobile road map having marks indicative of localities, lines indicative of roads connecting localities, figures adjacent said lines indicative of mileage between localities on roads indicated by such lines, certain of said lines having a differential characteristic indicating detours, said differential lines being so positioned between localities as to graphically indicate the distance of the extremities thereof from adjacent localities, figures between locality-indicating marks indicative of mileage between localities on roads without detours, and additional figures indicative of extra mileage between localities by way of said detours.

6. An automobile road map having marks indicative of localities, lines indicative of existing roads connecting localities, symbols indicative of distances between localities, and symbols indicative of the conditions of such roads in average speed in miles per hour maintainable thereover.

7. An automobile road map having marks indicative of localities, lines indicative of existing roads connecting localities, and including sections of differential characteristics indicative of sections of road closed to traffic, symbols indicative of distances between localities, symbols indicative of the distance over detours about sections of road closed to traffic, said symbols being differentiated from and positioned adjacent the symbols indicative of distances between localities, and symbols indicative of conditions of the roads, including detours, between localities in average speed in miles per hour maintainable thereover.

8 An automobile road map having marks indicative of localities, lines indicative of roads connecting localties, figures adjacent said lines indicative of mileage between localities on roads indicated by such lines, lines of differential characteristics terminating on said lines indicative of roads and indicative of the route of detours about sections of road temporarily closed, and additional figures positioned adjacent said figures indicative of mileage between localities and indicative of additional mileage between localities because of said detours.

In testimony of which invention, I have hereunto set my hand, at Phila., Penna., on this 25th day of April, 1921.

HARRY C. KESSLER.